US011814506B2

(12) United States Patent
Clopotel et al.

(10) Patent No.: US 11,814,506 B2
(45) Date of Patent: Nov. 14, 2023

(54) MODIFIED ASPHALTS WITH ENHANCED RHEOLOGICAL PROPERTIES AND ASSOCIATED METHODS

(71) Applicant: MARATHON PETROLEUM COMPANY LP, Findlay, OH (US)

(72) Inventors: Cristian Clopotel, Findlay, OH (US); Donald Siler, Findlay, OH (US); Brian Wilt, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 520 days.

(21) Appl. No.: 16/913,605

(22) Filed: Jun. 26, 2020

(65) Prior Publication Data

US 2021/0002484 A1    Jan. 7, 2021

Related U.S. Application Data

(60) Provisional application No. 62/869,750, filed on Jul. 2, 2019.

(51) Int. Cl.
| | | |
|---|---|---|
| *C08L 95/00* | (2006.01) | |
| *C08L 9/08* | (2006.01) | |
| *C08L 25/10* | (2006.01) | |
| *C08K 11/00* | (2006.01) | |
| *C08J 3/20* | (2006.01) | |

(52) U.S. Cl.
CPC ............ *C08L 95/00* (2013.01); *C08K 11/005* (2013.01); *C08L 9/08* (2013.01); *C08L 25/10* (2013.01); *C08J 3/20* (2013.01); *C08L 2555/52* (2013.01); *C08L 2555/74* (2013.01); *C08L 2555/86* (2013.01)

(58) Field of Classification Search
CPC . C08L 9/08; C08L 25/10; C08L 95/00; C08K 11/005
See application file for complete search history.

(56) References Cited

U.S. PATENT DOCUMENTS

| | | | |
|---|---|---|---|
| 2,027,404 A | 1/1936 | Small | |
| 2,102,124 A | 12/1937 | Lithgow | |
| 2,290,038 A | 7/1942 | Folmsbee | |
| 2,605,193 A | 7/1952 | Karll | |
| 2,850,436 A | 9/1958 | Beuther | |
| 2,877,129 A | 3/1959 | Hardman | |
| 2,906,635 A | 9/1959 | Teot | |
| 3,047,414 A | 7/1962 | Katz | |
| 3,072,284 A | 1/1963 | Luhman | |
| 3,162,101 A | 12/1964 | Rostler | |
| 3,221,615 A | 12/1965 | McGovern | |
| 3,238,173 A | 3/1966 | Bailey | |
| 3,261,269 A | 7/1966 | McGovern | |
| 3,344,056 A | 9/1967 | Rostler | |
| 3,432,321 A | 3/1969 | Rostler | |
| 3,556,827 A | 1/1971 | McConnaughay |
| 3,867,111 A | 2/1975 | Knowles |
| 3,955,416 A | 5/1976 | Waiwood |
| 3,992,340 A | 11/1976 | Bonitz |
| 4,064,826 A | 12/1977 | Pauli |
| 4,073,625 A | 2/1978 | Kiritani et al. |
| 4,082,823 A | 4/1978 | Augustine |
| 4,084,915 A | 4/1978 | Wiseblood |
| 4,112,765 A | 9/1978 | Hollweck |
| 4,130,474 A | 12/1978 | Anthony |
| 4,145,322 A | 3/1979 | Maldonado |
| 4,154,710 A | 5/1979 | Maldonado |
| 4,162,999 A | 7/1979 | Bohemen |
| 4,237,052 A | 12/1980 | Fitoussi |
| 4,242,246 A | 12/1980 | Maldonado |
| 4,320,788 A | 3/1982 | Lord |
| 4,323,496 A | 4/1982 | Mitani |
| 4,330,449 A | 5/1982 | Maldonado |
| 4,373,961 A | 2/1983 | Stone |
| 4,392,870 A | 7/1983 | Chieffo |
| 4,541,735 A | 9/1985 | Abu-Isa |
| 4,549,834 A | 10/1985 | Allen |
| 4,554,313 A | 11/1985 | Hagenbach |
| 4,564,834 A | 1/1986 | Steele |
| 4,585,816 A | 4/1986 | Vitkuske |
| 4,647,313 A | 3/1987 | Clementoni |
| 4,762,565 A | 8/1988 | Graf |
| 4,789,946 A | 12/1988 | Sinz |
| 4,971,219 A | 11/1990 | Dombeck et al. |

(Continued)

FOREIGN PATENT DOCUMENTS

| | | |
|---|---|---|
| CA | 1262976 | 11/1989 |
| CN | 2871674 | 2/2007 |

(Continued)

OTHER PUBLICATIONS

Acromag, Whitepaper: Introduction to the Two-Wire Transmitter and the 4-20MA Current Loop, Nov. 8, 2010, available at http://www.automation.com/pdf-articles/Acromag-Intro-TwoWire-Transmitters-4-20mA-Current-Loop-904A.pdf.
Dataforth Corporation, Application Note: 4-20 mA Transmitters, May 24, 2002, available at http://www.dataforth.com/catalog/bb/152-138011998.pdf.
RAPTOR Overfill Protection Probe, TPF, Inc., Jun. 3, 2013, available at http://tpftherm.com/pdf/2TPFB.pdf.
Lee et al. A decision support system for vessel speed decision in maritime logistics using weather archive big data, 2017, Elsevier, Computers and Operations Research 98, 330-342 (Year: 2017).
Torralba A. et al, Paper 132—Smart Navigation System for the Port of Seville, Buenos Aires, Argentina, Sep. 7-11, 2015.
Etienne, Mary et al., Intelligent Maritime Modern Ships and Ports, Dell Technologies and Intel Corporation, May 2020.

(Continued)

*Primary Examiner* — Edward J Cain

(74) *Attorney, Agent, or Firm* — Womble Bond Dickinson (US) LLP

(57) ABSTRACT

A modified asphalt binder with improved elastic properties and methods of making such modified asphalt binder. The modified asphalt binders may include one or more of an asphalt binder, a solvent deasphalted (SDA) pitch, a polymeric material, and optionally, a ground tire rubber. The disclosed modified asphalt binders exhibit properties consistent with decreased susceptibility to rutting and thus may be used in asphalt concrete applications.

20 Claims, No Drawings

(56) References Cited

U.S. PATENT DOCUMENTS

| | | |
|---|---|---|
| 5,008,653 A | 4/1991 | Kidd |
| 5,023,282 A | 6/1991 | Neubert |
| 5,039,342 A | 8/1991 | Jelling |
| 5,050,603 A | 9/1991 | Stokes |
| 5,083,870 A | 1/1992 | Sindelar et al. |
| 5,118,733 A | 6/1992 | Gelles |
| 5,120,777 A | 6/1992 | Chaverot |
| 5,177,130 A | 1/1993 | Beavers |
| 5,180,428 A | 1/1993 | Koleas |
| 5,234,494 A | 8/1993 | Sawatzky et al. |
| 5,472,928 A | 12/1995 | Scheuerman et al. |
| 5,498,327 A | 3/1996 | Stangeland et al. |
| 5,511,573 A | 4/1996 | Corte |
| 5,559,166 A | 9/1996 | Bearden |
| 5,589,057 A | 12/1996 | Trimble et al. |
| 5,601,697 A | 2/1997 | Miller |
| 5,660,715 A | 8/1997 | Trimble et al. |
| 5,681,369 A | 10/1997 | Osborne |
| 5,766,333 A | 6/1998 | Lukens |
| 5,816,708 A | 10/1998 | Urich |
| 5,853,455 A | 12/1998 | Gibson |
| 5,911,817 A | 6/1999 | Hayner |
| 5,916,529 A | 6/1999 | Scheuerman |
| 5,938,130 A | 8/1999 | Zickell |
| 5,966,311 A | 10/1999 | Stemporzewski, Jr. |
| 6,001,162 A | 12/1999 | Hayner |
| 6,015,440 A | 1/2000 | Noureddini |
| 6,074,128 A | 6/2000 | Marino |
| 6,083,988 A | 7/2000 | Becker |
| 6,086,749 A | 7/2000 | Kramer et al. |
| 6,133,351 A | 10/2000 | Hayner |
| 6,153,004 A | 11/2000 | Hayner |
| 6,156,113 A | 12/2000 | Pasquier |
| 6,174,501 B1 | 1/2001 | Noureddini |
| 6,203,585 B1 | 3/2001 | Majerczak |
| 6,214,103 B1 | 4/2001 | Kitagawa |
| 6,223,789 B1 | 5/2001 | Koch |
| 6,235,104 B1 | 5/2001 | Chattopadhyay |
| 6,249,241 B1 | 6/2001 | Jordan et al. |
| 6,290,152 B1 | 9/2001 | Zickell |
| 6,318,402 B1 | 11/2001 | Ladeira |
| 6,336,479 B1 | 1/2002 | Nanaji |
| 6,348,074 B2 | 2/2002 | Wenzel |
| 6,352,637 B1 | 3/2002 | Doolin et al. |
| 6,380,284 B1 | 4/2002 | Lopez |
| 6,384,112 B1 | 5/2002 | Boussad |
| 6,394,149 B1 | 5/2002 | Parsons |
| 6,414,056 B1 | 7/2002 | Puzic |
| 6,414,066 B1 | 7/2002 | Lem |
| 6,416,249 B1 | 7/2002 | Crupi |
| 6,417,421 B1 | 7/2002 | Yao |
| 6,514,331 B2 | 2/2003 | Varnadoe et al. |
| 6,514,332 B2 | 2/2003 | Varnadoe et al. |
| 6,548,580 B1 | 4/2003 | Rohde |
| 6,575,326 B2 | 6/2003 | Martin, Jr. |
| 6,615,658 B2 | 9/2003 | Snelling |
| 6,659,684 B1 | 12/2003 | Goodhart et al. |
| 6,749,677 B2 | 6/2004 | Freisthler |
| 6,764,542 B1 | 7/2004 | Lackey |
| 6,776,832 B2 | 8/2004 | Spence et al. |
| 6,802,897 B1 | 10/2004 | Lackey |
| 6,852,779 B1 | 2/2005 | Planche |
| 6,927,245 B2 | 8/2005 | Buras et al. |
| 6,932,123 B1 | 8/2005 | Craig |
| 6,935,387 B1 | 8/2005 | Blubaugh |
| 6,948,364 B2 | 9/2005 | Snelling |
| 6,952,996 B2 | 10/2005 | Sisk et al. |
| 6,973,828 B2 | 12/2005 | Zimmermann |
| 7,008,670 B1 | 3/2006 | Freisthler |
| 7,028,382 B2 | 4/2006 | Fisher |
| 7,041,717 B2 | 5/2006 | Margulis |
| 7,047,114 B1 | 5/2006 | Rogers |
| 7,241,821 B1 | 7/2007 | Hayner et al. |
| 7,297,204 B2 | 11/2007 | Crews et al. |
| 7,309,390 B2 | 12/2007 | Falkiewicz |
| 7,357,594 B2 | 4/2008 | Takamura |
| 7,417,081 B2 | 8/2008 | Nakajima et al. |
| 7,503,724 B2 | 3/2009 | Blacklidge |
| 7,568,835 B2 | 8/2009 | Pils |
| 7,645,114 B2 | 1/2010 | Cannon et al. |
| 7,811,372 B2 | 10/2010 | Nigen-Chaidron et al. |
| 7,848,912 B2 | 12/2010 | Bertini |
| 7,849,802 B2 | 12/2010 | Dalrymple |
| 7,918,624 B2 | 4/2011 | Blacklidge |
| 7,951,857 B2 | 5/2011 | Crews et al. |
| 7,993,442 B2 | 8/2011 | Crews et al. |
| 8,026,380 B2 | 9/2011 | Hassan et al. |
| 8,193,401 B2 | 6/2012 | McGehee et al. |
| 8,206,500 B1 | 6/2012 | Mathis et al. |
| 8,278,451 B2 | 10/2012 | Becker et al. |
| 8,286,673 B1 | 10/2012 | Recker et al. |
| 8,316,708 B2 | 11/2012 | Horst |
| 8,337,117 B2 | 12/2012 | Vitale et al. |
| 8,404,037 B2 | 3/2013 | Naidoo et al. |
| 8,454,979 B2 | 6/2013 | Mitarai et al. |
| 8,634,970 B2 | 1/2014 | Lee et al. |
| 8,722,771 B2 | 5/2014 | Vaidya et al. |
| 8,783,280 B2 | 7/2014 | Yandle |
| 8,789,564 B2 | 7/2014 | Jividen et al. |
| 8,814,464 B2 | 8/2014 | McDade et al. |
| 8,821,064 B1 | 9/2014 | Morris et al. |
| 8,859,649 B2 | 10/2014 | Ranka |
| 8,926,742 B2 | 1/2015 | Coe |
| 8,968,457 B2 | 3/2015 | Payne |
| 8,979,982 B2 | 3/2015 | Jordan |
| 8,992,118 B2 | 3/2015 | Coe |
| 9,028,602 B2 | 5/2015 | Chughtai et al. |
| 9,115,295 B2 | 8/2015 | Deneuvillers et al. |
| 9,139,720 B2 | 9/2015 | Avramidis et al. |
| 9,139,733 B2 | 9/2015 | McDade et al. |
| 9,139,953 B2 | 9/2015 | Ahluwalia |
| 9,150,140 B2 | 10/2015 | Girard et al. |
| 9,295,992 B2 | 3/2016 | Zickell |
| 9,347,187 B2 | 5/2016 | Coe |
| 9,376,565 B2 | 6/2016 | Subotic et al. |
| 9,416,274 B2 | 8/2016 | Frank |
| 9,481,794 B2 | 11/2016 | Cox |
| 9,493,633 B2 | 11/2016 | Rowland et al. |
| 9,513,135 B2 | 12/2016 | MacNeille et al. |
| 9,523,003 B2 | 12/2016 | Williams et al. |
| 9,556,631 B2 | 1/2017 | Brooks et al. |
| 9,597,628 B2 | 3/2017 | Kummerer et al. |
| 9,650,580 B2 | 5/2017 | Merdrignac et al. |
| 9,790,360 B2 | 10/2017 | Puchalski et al. |
| 9,862,820 B2 | 1/2018 | Kim et al. |
| 9,868,855 B2 | 1/2018 | Merck et al. |
| 9,969,884 B2 | 5/2018 | Murthy et al. |
| 9,982,136 B2 | 5/2018 | Cao et al. |
| 10,030,145 B2 | 7/2018 | Severance et al. |
| 10,076,430 B2 | 9/2018 | Klausen |
| 10,127,515 B2 | 11/2018 | Borgerson et al. |
| 10,174,201 B2 | 1/2019 | Avramidis |
| 10,214,617 B1 | 2/2019 | Bruns et al. |
| 10,233,120 B2 | 3/2019 | Flanigan |
| 10,294,616 B2 | 5/2019 | Crupi et al. |
| 10,316,192 B2 | 6/2019 | Kurth et al. |
| 10,323,147 B1 | 6/2019 | Brewster et al. |
| 10,323,148 B1 | 6/2019 | Brewster et al. |
| 10,329,426 B2 | 6/2019 | Kurth et al. |
| 10,337,154 B2 | 7/2019 | Baumrind |
| 10,339,478 B2 | 7/2019 | Grant et al. |
| 10,363,529 B1 | 7/2019 | Alberty |
| 10,442,872 B2 | 10/2019 | Besse et al. |
| 10,449,502 B2 | 10/2019 | Rovani, Jr. et al. |
| 10,527,547 B2 | 1/2020 | Hofko et al. |
| 10,570,286 B2 | 2/2020 | Williams |
| 10,626,050 B2 | 4/2020 | Muncy et al. |
| 10,626,275 B2 | 4/2020 | Coe |
| 10,669,203 B2 | 6/2020 | Franzen et al. |
| 10,669,463 B2 | 6/2020 | Bahr |
| 10,724,183 B2 | 7/2020 | Coe |
| 10,767,033 B2 | 9/2020 | Kluttz et al. |
| 10,793,720 B2 | 10/2020 | Puchalski et al. |
| 10,794,017 B2 | 10/2020 | Coe |

(56) References Cited

U.S. PATENT DOCUMENTS

| | | |
|---|---|---|
| 10,889,940 B2 | 1/2021 | Crupi |
| 10,961,395 B2 | 3/2021 | Williams et al. |
| 10,982,097 B2 | 4/2021 | Larusso et al. |
| 10,988,617 B2 | 4/2021 | McClellan, Jr. et al. |
| 11,077,045 B2 | 8/2021 | Sen et al. |
| 11,091,642 B2 | 8/2021 | Kurth et al. |
| 11,097,981 B2 | 8/2021 | Reinke et al. |
| 11,124,926 B2 | 9/2021 | Fennell et al. |
| 11,155,696 B2 | 10/2021 | Fini |
| 11,193,243 B2 | 12/2021 | Chesky |
| 11,225,576 B2 | 1/2022 | Jorda et al. |
| 11,365,318 B2 | 6/2022 | Kwon et al. |
| 11,390,750 B2 | 7/2022 | Baumgardner et al. |
| 11,414,549 B2 | 8/2022 | Allen et al. |
| 11,421,109 B2 | 8/2022 | McCurdy et al. |
| 11,427,697 B2 | 8/2022 | Reinke et al. |
| 11,447,637 B2 | 9/2022 | Gabel et al. |
| 11,512,437 B2 | 11/2022 | McDade |
| RE49,447 E | 3/2023 | Brewster et al. |
| 11,623,990 B2 | 4/2023 | Baumgardner |
| 11,634,875 B2 | 4/2023 | Fennell et al. |
| 11,655,419 B2 | 5/2023 | Nicholson |
| 2002/0026884 A1 | 3/2002 | Raad |
| 2007/0277430 A1 | 12/2007 | Jackman |
| 2009/0036694 A1 | 2/2009 | Hassan et al. |
| 2009/0056201 A1 | 3/2009 | Morgan |
| 2009/0127499 A1 | 5/2009 | Tran |
| 2009/0137705 A1 | 5/2009 | Faucon Dumont et al. |
| 2009/0226254 A1 | 9/2009 | Jones |
| 2010/0034586 A1 | 2/2010 | Bailey et al. |
| 2010/0048771 A1 | 2/2010 | Osborn |
| 2010/0062219 A1 | 3/2010 | Richards |
| 2010/0088142 A1 | 4/2010 | El-Bakry et al. |
| 2010/0020918 A1 | 8/2010 | Wiley |
| 2010/0289654 A1 | 11/2010 | Hunter |
| 2011/0105652 A1 | 5/2011 | Hergenrother |
| 2012/0017804 A1 | 1/2012 | Venema et al. |
| 2012/0060722 A1 | 3/2012 | Montpeyroux et al. |
| 2013/0197134 A1 | 8/2013 | Leal et al. |
| 2013/0276668 A1 | 10/2013 | Ranka et al. |
| 2013/0344012 A1 | 12/2013 | Cohen |
| 2014/0270953 A1 | 9/2014 | Duffy |
| 2014/0284520 A1 | 9/2014 | Hategan |
| 2014/0343192 A1 | 11/2014 | Cochran et al. |
| 2014/0356526 A1 | 12/2014 | O'Connell et al. |
| 2015/0087753 A1 | 3/2015 | Koleas et al. |
| 2015/0307013 A1 | 10/2015 | Tremblay et al. |
| 2016/0052169 A1 | 2/2016 | Baumrind et al. |
| 2016/0122507 A1 | 5/2016 | Cox |
| 2016/0194581 A1 | 7/2016 | Phillips |
| 2016/0236980 A1 | 8/2016 | Mullenbach et al. |
| 2016/0289452 A1 | 10/2016 | O'Connell et al. |
| 2016/0362338 A1 | 12/2016 | Reinke et al. |
| 2016/0376440 A1 | 12/2016 | Naidoo et al. |
| 2017/0096092 A1 | 4/2017 | Cannon |
| 2017/0107376 A1 | 4/2017 | Winship et al. |
| 2017/0114281 A1 | 4/2017 | Gupta et al. |
| 2017/0152384 A1 | 6/2017 | Eijkenboom |
| 2017/0306570 A1 | 11/2017 | Crupi et al. |
| 2017/0349725 A1 | 12/2017 | Broere |
| 2017/0370899 A1 | 12/2017 | Porot et al. |
| 2018/0010305 A1 | 1/2018 | Bentaj et al. |
| 2018/0044529 A1 | 2/2018 | Kurth et al. |
| 2018/0112303 A1 | 4/2018 | Antony |
| 2018/0148575 A1 | 5/2018 | Kurth et al. |
| 2018/0200264 A1 | 7/2018 | Blau et al. |
| 2018/0266578 A1 | 9/2018 | Baxter |
| 2018/0060808 A1 | 11/2018 | Borgerson et al. |
| 2018/0340068 A1 | 11/2018 | McCurdy et al. |
| 2018/0371251 A1 | 12/2018 | Avramidis et al. |
| 2019/0048191 A1 | 2/2019 | Leon et al. |
| 2019/0153229 A1 | 5/2019 | Reinke et al. |
| 2019/0300714 A1 | 10/2019 | Watson et al. |
| 2019/0375940 A1 | 12/2019 | Franzen et al. |
| 2020/0002538 A1 | 1/2020 | Wissel et al. |
| 2020/0032063 A1 | 1/2020 | Lungren et al. |
| 2020/0094924 A1 | 3/2020 | Gaziotis et al. |
| 2020/0118068 A1 | 4/2020 | Turetsky et al. |
| 2020/0123449 A1 | 4/2020 | Nicholson |
| 2020/0165459 A1 | 5/2020 | Williams et al. |
| 2020/0265377 A1 | 8/2020 | Al Dhaheri et al. |
| 2020/0277497 A1 | 9/2020 | Reinke et al. |
| 2020/0317925 A1 | 10/2020 | Hassan et al. |
| 2020/0332126 A1 | 10/2020 | Donelson |
| 2020/0372375 A1 | 11/2020 | Pathak et al. |
| 2021/0017386 A1 | 1/2021 | Reinke et al. |
| 2021/0054210 A1 | 2/2021 | Hemsley et al. |
| 2021/0079224 A1 | 3/2021 | Cochran et al. |
| 2021/0095429 A1 | 4/2021 | Murphy et al. |
| 2021/0139374 A1 | 5/2021 | Bruns et al. |
| 2021/0147751 A1 | 5/2021 | Fini et al. |
| 2021/0230255 A1 | 7/2021 | Amadoro et al. |
| 2021/0230818 A1 | 7/2021 | Fennell et al. |
| 2021/0236815 A1 | 8/2021 | Waldstreicher et al. |
| 2021/0238093 A1 | 8/2021 | Eyster |
| 2021/0241221 A1 | 8/2021 | Pathak et al. |
| 2021/0284574 A1 | 9/2021 | Kurth et al. |
| 2021/0338562 A1 | 11/2021 | Akthakul et al. |
| 2021/0362637 A1 | 11/2021 | Hanis |
| 2021/0371339 A1 | 12/2021 | Dennis et al. |
| 2021/0371567 A1 | 12/2021 | Vanderhoof et al. |
| 2022/0001345 A1 | 1/2022 | Ahn et al. |
| 2022/0002548 A1 | 1/2022 | Wissel et al. |
| 2022/0033305 A1 | 2/2022 | Cochran et al. |
| 2022/0089832 A1 | 3/2022 | Yi et al. |
| 2022/0101272 A1 | 3/2022 | Sunde et al. |
| 2022/0106537 A1 | 4/2022 | Aritake et al. |
| 2022/0112130 A1 | 4/2022 | Williams et al. |
| 2022/0153645 A1 | 5/2022 | Zhou |
| 2022/0267602 A1 | 8/2022 | Cooley et al. |
| 2022/0315766 A1 | 10/2022 | Baumgardner et al. |
| 2022/0372257 A1 | 11/2022 | Coe |
| 2022/0389669 A1 | 12/2022 | Miller |
| 2022/0402819 A1 | 12/2022 | Mangel et al. |
| 2023/0033496 A1 | 2/2023 | Townsend et al. |
| 2023/0072410 A1 | 3/2023 | Inoubli et al. |
| 2023/0085865 A1 | 3/2023 | Bruns et al. |
| 2023/0086227 A1 | 3/2023 | Bruns et al. |
| 2023/0092077 A1 | 3/2023 | Lorenzen et al. |

FOREIGN PATENT DOCUMENTS

| | | |
|---|---|---|
| CN | 106934143 A | 7/2017 |
| CN | 206917912 | 1/2018 |
| CN | 111879637 A | 11/2020 |
| CN | 111986520 A | 11/2020 |
| CN | 113110464 A | 7/2021 |
| CN | 113921091 A | 1/2022 |
| CN | 114112889 A | 3/2022 |
| CN | 114113552 A | 3/2022 |
| DE | 4124142 A1 | 1/1993 |
| DE | 9213661 | 1/1993 |
| DE | 19519539 A1 | 12/1995 |
| EP | 0870291 B1 | 10/1998 |
| EP | 2290010 A1 | 3/2011 |
| EP | 3291206 A1 | 3/2018 |
| EP | 3441260 | 2/2019 |
| FR | 2478122 | 9/1981 |
| GB | 2205104 A | 11/1988 |
| IN | 293683 | 3/2018 |
| KR | 10-2017-0011981 A | 2/2017 |
| KR | 101952894 | 2/2019 |
| KR | 102195378 B1 | 12/2020 |
| PL | 157791 | 7/1992 |
| RU | 1787994 | 1/1993 |
| RU | 2123719 C1 | 12/1998 |
| SU | 816996 A1 | 3/1981 |
| WO | 200055257 | 9/2000 |
| WO | 2007068461 A1 | 6/2007 |
| WO | 2009/147360 | 12/2009 |
| WO | 2011034423 | 3/2011 |

(56) References Cited

FOREIGN PATENT DOCUMENTS

WO     20190234434     12/2019
WO     2021254815 A1     12/2021

OTHER PUBLICATIONS

Negenborn, Rudy et al., Smart Port, Smart ships and the changing maritime ecosystem, SmartPort, Sep. 2018.

Lind, Mikael et al., Sea Traffic Management—Beneficial for all Maritime Stakeholders, Transportation Research Procedia, Dec. 2016.

Xiao, Yi et al., Digital empowerment for shipping development: a framework for establishing a smart shipping index system, Maritime Policy & Management, Feb. 27, 2021.

Tian Zhe et al., The Development of Key Technologies in Applications of Vessels Connected to the Internet, Symmetry, 2017.

Van Westrenen et al., Maritime traffic management: a need for central coordination?, Springer-Verlag London Limited 2012.

Emco Wheaton, Vapor Transfer Vents, 2020. https://www.gardnerdenver.com/en-us/emcowheaton/fuel-systems/tank-truck-equipment/vapor-transfer-vents.

Sun, Zhaojie et al., Investigation of the potential application of biodiesel by-product as asphalt modifer, Road Materials and Pavement Design 17(3):1-16, Oct. 2015.

ND ASSOCIATED METHODS

MODIFIED ASPHALTS WITH ENHANCED RHEOLOGICAL PROPERTIES AND ASSOCIATED METHODS

FIELD OF THE DISCLOSURE

The present disclosure relates to modified asphalt binders having improved rheological properties and methods of making them. Such modified asphalt binders may include, but are not limited to, an asphalt binder, solvent deasphalted pitch, a polymeric material, and optionally, ground tire rubber.

BACKGROUND

Asphalt, also known as bitumen, is a sticky, black, and highly viscous liquid or semi-solid petroleum product. Classified as a pitch, asphalt may be obtained from natural deposits, or more commonly, as a product of crude oil refining. Asphalt is a natural constituent of crude oil, and there are some crude oils that are composed almost entirely of asphalt. Generally, crude petroleum is separated by distillation into various fractions. After separation, these fractions are further refined into other products such as paraffin, gasoline, naphtha, lubricating oil, kerosene, diesel oil, and asphalt. Asphalt is the heavy constituent of crude petroleum, and does not distill off during the distillation process. Asphalt is essentially the residue remaining from the oil refining process.

Most crude-derived asphalt is sold and used as asphalt binder to bind mineral aggregates in asphalt concrete. Asphalt concrete, also referred to as blacktop or pavement, is a composite material used to surface roads and parking lots. Often shorthanded as "asphalt," asphalt concrete generally includes coarse- to medium-grained particulate aggregate material that is bound together with asphalt binder, which is laid down in layers on the surface to be paved and then compacted. Conventional asphalt concrete suffers from different types of distress modes, including permanent deformation. Particularly, asphalt concrete can deform to cause a depression or groove in the driving surface, also known as rutting. Rutting can prevent the designed removal of rain water from road surfaces, which can contribute to hydroplaning. Severe rutting can also cause steering difficulties. To prevent or reduce rutting, polymers and other modifiers having a high Young's modulus relative to asphalt are often incorporated into asphalt binders to increase stiffness. Typical polymers used to modify asphalt include polyphosphoric acid (PPA), or elastomers such as styrene/butadiene/styrene copolymer (SBS), or polyethylene, ethylene/vinyl acetate copolymer (EVA). Asphalt cement that exhibits a high degree of stiffness can mitigate against rutting. Solvent deasphalted pitch (SDA), also known as 0/10 penetration asphalt, is a hard, brittle material that has also been used to modify asphalt binders to increase resistance to rutting. However, as asphalt becomes harder, it exhibits reduced elastic recovery properties. Such elastic recovery is important for the long-term service performance of the asphalt concrete.

In 1993, the Performance Graded (PG) asphalt binder specifications were introduced as part of the Superpave system and adopted as AASHTO M320. These new PG specifications that take into account both high and low temperatures, traffic loading rates including both speed and volume, and ageing of the binder within the testing framework to assess binder performance. In the Superpave system, a dynamic shear rheometer (DSR) is used to characterize the stiffness and elasticity properties of asphalt binders at high and intermediate temperatures. During operation of the DSR, an asphalt sample is placed between two parallel plates, a torque is applied, and the response is measured. The test results are used to estimate the resistance to rutting and fatigue cracking. However, AASHTO M320 was developed around neat (unmodified) asphalt binders and did not properly characterize modified asphalt binders, specifically those modified with elastomeric polymers.

The Multiple Stress Creep Recovery (MSCR) test was subsequently introduced to evaluate bituminous or asphalt binders at high service temperatures, and in particular to evaluate the stress or loading resistance of bituminous or asphalt binders using the well-established creep and recovery test concepts. In the MSCR test, two separate parameters can be determined—non-recoverable creep compliance ($J_{nr}$) and percentage of recovery (MSCR Recovery) during each loading cycle. Accordingly, the MSCR test evaluates the elastic recovery and the stress sensitivity of asphalt binders. Asphalt binders that meet the appropriate $J_{nr}$ specification are expected to minimize the asphalt binder's contribution to rutting. States in the northeastern United States were the first to fully adopt MSCR standards for all binder grades, and it is expected that other U.S. states will soon follow. Thus, it is desirable to provide modified asphalt binders that are designed to reduce rutting and comply with both the non-recoverable creep and the elastic recovery requirements of the MSCR test.

BRIEF SUMMARY

The present disclosure generally provides novel modified asphalt binders that include, but are not limited to, an asphalt binder, a solvent deasphalted (SDA) pitch, and a polymeric material. The polymeric material may have a styrene-butadiene structure, such as a styrene-butadiene or styrene-butadiene-styrene copolymer.

Accordingly, in one aspect, the disclosure provides a modified asphalt binder. The modified asphalt binder may include, but is not limited to, an asphalt binder, a solvent deasphalted (SDA) pitch, and a polymeric material. In one or more embodiments, the asphalt binder has two or more of: a viscosity of from about 1900 poise to about 3000 poise at 60° C. (140° F.); a G*/sin delta value in excess of 1.0 kPa at temperatures ranging from 64° C. to 67° C.; a non-recoverable creep compliance 3.2 kPa ($J_{nr3.2}$) value of <4.5 $kPa^{-1}$ at 64° C. and/or at 67° C.; a penetration of from about 45 to about 77 dmm at 25° C., where dmm represents 0.1 mm of penetration as measured with a penetrometer under ASTM D5; or a softening point greater than about 50° C. In at least one embodiment, the asphalt binder, prior to modification, has a performance grade (PG) designation of from PG 64-22 to PG 67-22.

In one or more embodiments, the SDA pitch has a penetration of from 0-10 dmm, a softening point of from about 210° F. to about 240° F., or both. In at least one embodiment, the SDA pitch is present in an amount from about 1% to about 7% by weight, based on the weight of the asphalt binder and SDA.

In one or more embodiments, the SDA pitch is present in an amount from about 5% to about 6% by weight, based on the total weight of the modified asphalt binder.

In one or more embodiments, the polymeric material is selected from styrene-butadiene (SB) copolymers, styrene-butadiene-styrene (SBS) copolymers, ground tire rubber, or combinations thereof. In one embodiment, the styrene-butadiene (SB) or styrene-butadiene-styrene (SBS) copolymers have a polymerized butadiene content by weight of at least about 68%. And, in at least one embodiment, the polymeric material is SB latex. In one or more embodiments, the SB latex is present in an amount from about 2% to about 4% by weight, based on the total weight of the modified asphalt binder. In one or more embodiments, the SB latex is present in an amount from about 2.2% to about 3% by weight, based on the total weight of the modified asphalt binder.

In a specific embodiment, the SDA pitch is present in an amount from about 5% to about 6% by weight, based on the total weight of the modified asphalt binder, and the polymeric material is a SB latex present in an amount from about 2.2% to about 3% by weight, based on the total weight of the modified asphalt binder.

In one or more embodiments, the polymeric material is ground tire rubber and styrene-butadiene-styrene (SBS) triblock copolymer. In one or more embodiments, the ground tire rubber is present in an amount from about 5% to about 20% by weight, based on the total weight of the modified asphalt binder; and the SBS triblock copolymer is present in an amount from about 0.1% to about 1% by weight, based on the total weight of the modified asphalt binder. In one or more embodiments, the ground tire rubber is present in an amount from about 7% to about 15% by weight, based on the total weight of the modified asphalt binder. In one or more embodiments, the SBS triblock copolymer is present in an amount from about 0.4% to about 0.6% by weight, based on the total weight of the modified asphalt binder. In one or more embodiments, sulfur is added as a cross linking agent in an amount by weight from about 0.1 to about 0.2%, based on the weight of the modified asphalt binder.

In another aspect, the modified asphalt binder may include, but is not limited to, an asphalt binder; a solvent deasphalted (SDA) pitch; a ground tire rubber; and a polymeric material selected from styrene-butadiene (SB) copolymers, styrene-butadiene-styrene (SBS) copolymers, or combinations thereof.

In one or more embodiments, the ground tire rubber is present in an amount from about 9% to about 13% by weight, based on the total weight of the modified asphalt binder; and the polymeric material is a SBS triblock copolymer in an amount from about 0.4% to about 0.6% by weight, based on the total weight of the modified asphalt binder.

In yet another aspect, an asphalt concrete pavement composition may include, but is not limited to, the modified asphalt binder as disclosed herein, in an amount from about from 1% to about 20% by weight, based on the total weight of the pavement composition; and an aggregate material.

In one or more embodiments, the aggregate includes one or more materials selected from the group consisting of stone, gravel, expanded aggregate, shells, ground silica, recycled asphalt, and Portland cement pavement.

In a further aspect, a method for producing an asphalt binder includes:
  i) combining a solvent deasphalted pitch, heated to a temperature from about 150° C. to about 250° C.; and an asphalt binder, heated to a temperature from about 150° C. to about 250° C., to form a first combination;
  ii) mixing the first combination to form a first mixture;
  iii) combining with the first mixture a polymeric material selected from styrene-butadiene (SB) copolymers, styrene-butadiene-styrene (SBS) copolymers, or combinations thereof, to form a second combination; and
  iv) mixing the second combination to form a SDA-polymer modified asphalt binder.

In one or more embodiments, the method further includes adding ground tire rubber to the SDA-polymer modified asphalt binder to form a third combination, and mixing the third combination to form a SDA-polymer-GTR modified asphalt binder. In one or more embodiments, the method further includes adding sulfur as a cross-linking agent in an amount by weight from about 0.1% to about 0.2%, based on the weight of the second combination or the third combination.

In one or more embodiments, the first combination is performed at a first physical location, and the combining of the polymeric material with the first mixture is performed at a second, different physical location. In one or more embodiments, the method further includes transporting the first mixture to a different physical location prior to the step of combining the first mixture with the polymeric material.

These and other features, aspects, and advantages of the disclosure will be apparent from a reading of the following detailed description. Other aspects and advantages of the present disclosure will become apparent from the following.

DETAILED DESCRIPTION

The present disclosure generally provides novel modified asphalt binders that include, but are not limited to, an asphalt binder, a solvent deasphalted (SDA) pitch, and a polymeric material. The polymeric material may have a styrene-butadiene structure, such as a styrene-butadiene or styrene-butadiene-styrene copolymer.

To reduce or prevent rutting of asphalt concretes, polymers have previously been incorporated into conventional asphalt binders to provide greater resistance to fatigue and thermal cracking. However, while such polymer-modified asphalt binders generally meet the Multiple Stress Creep Recovery (MSCR) requirements for non-recoverable creep compliance, they fail to pass the elastic recovery MSCR requirements. Solvent deasphalted pitch (SDA) has also been used to modify asphalt binders to increase resistance to rutting. However, like their polymer counterparts, SDA pitch-modified asphalts meet the non-recoverable creep compliance requirements of the MSCR test, but fail to pass the elastic recovery requirements of the MSCR test. Surprisingly and counterintuitively, it has been found, as further disclosed herein, that adding hard, brittle SDA pitch to asphalt modified with certain styrene-butadiene polymeric materials, alone or in the presence of ground tire rubber, provides modified asphalt binders with enhanced properties. Particularly, and unexpectedly, such SDA and polymer modified asphalt binders retain desirable non-recoverable creep compliance values, and exhibit enhanced elastic recovery that meets the requirements of the MSCR test. Specifically, according to embodiments of the present disclosure, asphalt binders modified with both SDA and styrene-butadiene polymers meet the MSCR specifications for the E grade designation. These results are particularly surprising in view of the hardness and brittleness of SDA pitch, which would not be expected to increase elastic recovery properties.

Embodiments of the present disclosure will now be described more fully hereinafter with reference to examples thereof. These example embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. It will be readily apparent to one of ordinary skill in the relevant arts that suitable modifications and adaptations to the compositions, methods, and applications described herein can be made without departing from the scope of any embodiments or aspects thereof.

The compositions and methods provided are exemplary and are not intended to limit the scope of the claimed embodiments. Therefore, it is to be understood that the present disclosure is not to be limited to the specific embodiments described and that modifications and other embodiments are intended to be included within the scope of the appended claims. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

All of the various embodiments, aspects, and options disclosed herein can be combined in all variations. The scope of the compositions, formulations, methods, and processes described herein include all actual or potential combinations of embodiments, aspects, options, examples, and preferences herein. Reference throughout this specification to "one embodiment", "certain embodiments", "one or more embodiments", or "an embodiment", means that a particular feature, structure, material, or characteristic described in connection with the embodiment is included in at least one embodiment. Thus, the appearances of phrases such as "in one or more embodiments," "in certain embodiments," "in one embodiment" or "in an embodiment" in various places throughout this specification are not necessarily referring to the same embodiment. Furthermore, the particular features, structures, materials, or characteristics may be combined in any suitable manner in one or more embodiments. Further embodiments may include any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosure, in any of its various aspects and embodiments, should be viewed as intended to be combinable unless the context clearly dictates otherwise.

All methods described herein can be performed in any suitable order unless otherwise indicated herein or otherwise clearly contradicted by context.

Definitions

As used in this specification and the claims, the singular forms "a", "an", and "the" include plural referents unless the context clearly dictates otherwise.

Any ranges cited herein are inclusive.

The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example, "about 5.0" includes 5.0.

Recitation of ranges of values herein are merely intended to serve as a shorthand method of referring individually to each separate value falling within the range, unless otherwise indicated herein, and each separate value is incorporated into the specification as if it were individually recited herein.

Unless otherwise indicated, all parts and percentages are by weight. "Weight percent (wt %)," or "percent by weight", if not otherwise indicated, is based on an entire composition.

As used herein, the term "asphalt" is used synonymously with "asphalt binder" and refers to a complex mixture of molecules, primarily hydrocarbons. Asphalt refers to any solid or semi-solid at room temperature, which gradually liquefies when heated, and in which the predominate constituents are naturally occurring bitumens, or residues commonly obtained in petroleum, synthetic petroleum, or shale oil refining, or from coal tar, or the like. Asphalts can be obtained or derived from, for example, crude petroleum, bituminous schists, heavy oils, bituminous sands, or coal.

Asphalt constituents include oils, resins, and asphaltenes. Oils are the light fraction, having molecular weights in the range of 24 to 800. Resins are the more polar fraction, having molecular weights in the range of 800-2000. Asphaltenes are high molecular weight molecules (1800-8000) and possess aromatic rings. An average asphalt has a ratio of asphaltenes/resins/oil by weight of approximately 23/27/50. Harder asphalts have correspondingly higher ratios of asphaltenes to resins and oil.

As used herein, the term "solvent deasphalted pitch" ("SDA") refers to an asphalt pitch material that has been treated with solvents (e.g., low molecular weight hydrocarbons) to dissolve aliphatic compounds but leave insoluble pitch materials containing primarily asphaltenes and other higher molecular weight components as a residue. The insoluble pitch residue becomes the "solvent deasphalted pitch." Suitable SDA pitches include solvent deasphalting bottoms. Solvent deasphalting bottoms are obtained from refinery feeds, such as vacuum tower bottoms, reduced crude (atmospheric), topped crude, and hydrocarbons comprising an initial boiling point of about 450° C. (850° F.) or above. Preferably, the solvent deasphalting bottoms are obtained from vacuum tower bottoms that have boiling points above about 538° C. (1000° F.). After solvent deasphalting, the resulting SDA bottoms (SDA pitch) have a boiling point above about 510° C. (950° F.), preferably above about 540° C. (1000° F.).

As used herein, the term "high shear condition" or "high shear mixing" refers to a method of mixing components (e.g., an asphalt binder, SDA pitch, polymeric material, ground tire rubber, or any combination thereof) which results in flow and shear of the components. Generally, a high shear mixer uses a rotor or impeller, together with a stationary component (a "stator") to create shear, meaning one area of fluid (e.g., an asphalt binder, SDA pitch, polymeric material, ground tire rubber, or any combination thereof) travels with a different velocity relative to an adjacent area, resulting in highly effective mixing, dispersion, homogenization, or a combination thereof. In contrast, a "low shear condition" or "low shear mixing" are the result of low speed blending which does not create appreciable shear, such as stirring, or mixing using a conical screw, tumble, or ribbon mixer.

As used herein, the term "High Temperature Compliance (HTC)" refers to the lesser of two continuous grade (true grade) temperatures: the continuous grade (true grade) temperature corresponding to the "original" (unaged) asphalt grade and the continuous grade (true grade) temperature corresponding to the asphalt aged by the Rolling Thin-Film Oven (RTFO) procedure. The true grade temperature is defined as the temperature at which $G^*/\sin \delta = 1$ kPa for the unaged asphalt, and as the temperature at which G*/sin δ=2.2 kPa for asphalt aged by the RTFO procedure, where G* is the complex shear modulus and δ (delta) is the phase angle, determined on a dynamic shear rheometer according to American Association of State Highway and Transportation Officials (AASHTO) T315. The RTFO procedure provides simulated short term aged asphalt binder for physical property testing, mimicking the aging that occurs due to construction and initial service. The basic RTFO procedure takes unaged asphalt binder samples in cylindrical glass bottles and places these bottles in a rotating carriage within an oven. The carriage rotates within the oven while the 325° F. (163° C.) temperature ages the samples for 85 minutes (AASHTO method T240). Samples are then stored for use in physical properties tests.

As used herein, "non-recoverable creep compliance" is the residual shear strain in a specimen after a creep and recovery cycle divided by the shear stress applied. Non-recoverable creep compliance is designated as "$J_{nr}$", and is reported at 3.2 kPa (kilo Pascal) shear stress. $J_{nr}$ (compliance) is inversely related to complex modulus. The lower the $J_{nr}$ value, the stiffer the binder. The non-recoverable creep compliance at 3.2 kPa ($J_{nr3.2}$) is the selective parameter under AASHTO T350 (American Association of State and Highway Transportation Officials T350) that is used to quantify the asphalt rutting resistance according to traffic level as follows:

$J_{nr3.2}$<4.5 kPa$^{-1}$ is a S (standard) asphalt;
$J_{nr3.2}$<2 kPa$^{-1}$ is an H (heavy) asphalt;
$J_{nr3.2}$<1 kPa$^{-1}$ is a V (very heavy) asphalt; and
$J_{nr3.2}$<0.5 kPa$^{-1}$ is an E (extreme) asphalt.

The Standard Designation "S" is intended mostly for traffic levels fewer than 10 million Equivalent Single Axle Loads (ESALs) and more than the standard traffic speed (>70 km/h-43.5 mph). High Designation "H" is intended mostly for traffic levels of 10 to 30 ESALs or slow moving traffic (12 to 44 mph). Very High Designation "V" is intended mostly for traffic levels >30 million ESALs or standing traffic (<12 mph). Extremely High Designation "E" is intended mostly for traffic levels >30 million ESALs or standing traffic (<12 mph), such as toll plazas and port facilities.

As used herein, the term "percent recovery" is the ratio of the difference between the peak strain and the residual strain to the peak strain, expressed as a percentage ("% R"). % R is a measure of the elastic response of an asphalt binder at a given temperature and applied stress level, generally at 3.2 kPa (% $R_{3.2}$). Recovery is indicative of how readily an asphalt binder sample will return to its original shape after being subjected to a load or stress. It is generally desirable to achieve a % R greater than about 40%.

As used herein, the term "z-factor" is the relationship between the non-recoverable creep compliance and the percent recovery at 3.2 kPa, and is defined according to the formula:

$$z\text{-factor}=\% R_{3.2}-(29.371*Jnr_{3.2}^{-0.2633}).$$

The z-factor is used, together with $J_{nr3.2}$, in grading asphalts. An asphalt will pass the MSCR criteria by meeting both the $J_{nr3.2}$ criterion and having a positive z-factor (i.e., greater than 0).

The Multiple Stress Creep Recovery (MSCR) test, with its methodology described in AASHTO (American Association of State and Highway Transportation Officials) T350-14 and its specification described in AASHTO M332-14, has been proposed as a test method to characterize the rutting resistance of asphalt binders. The MSCR test is conducted using a dynamic shear rheometer at a specified temperature. The test provides a new high temperature binder specification that is intended to more accurately predict the rutting performance of an asphalt binder. To perform the Multiple Stress Creep Recovery (MSCR) test, a one second creep load stress (0.1 kPa) is applied to a sample of modified asphalt binder, followed by a nine second recovery period for 20 creep/recovery cycles. The stress is then increased to 3.2 kPa and repeated for an additional 10 cycles. The non-recoverable creep compliance is calculated by dividing the average of the non-recoverable strain by the applied stress (for both 0.1 and 3.2 kPa).

Many states in the United States have adopted the MSCR test and specifications, under which many modified asphalt binders have been determined to lack the requisite values for non-recoverable creep compliance, elastic recovery, or both. For example, inclusion of only solvent deasphalted (SDA) pitch increases the asphalt binder resistance to permanent deformations, as quantified by the non-recoverable creep compliance at 3.2 kPa, but the modified asphalt binder does not meet the elastic recovery criteria as quantified by the z-factor (z>0), as further disclosed herein below. Similarly, asphalt binder modified with only 3% styrene-butadiene rubber (SBR) latex also fails to meet the MSCR z-factor.

Surprisingly, according to one or more embodiments of the present disclosure, it has been found that modified asphalt binders having an asphalt binder, a solvent deasphalted (SDA) pitch, and a polymeric material of a styrene-butadiene or styrene-butadiene-styrene structure provide enhanced elastic recovery properties relative to asphalt binders having only a SDA pitch or such polymeric material alone. In view of the hardness and brittleness of SDA pitch, the addition of SDA pitch to a styrene-butadiene polymer modified asphalt binder would not be expected to enhance elastic recovery properties and thus is an unexpected result.

In a first embodiment, a modified asphalt binder is disclosed that includes, but is not limited to, an asphalt binder, a solvent deasphalted (SDA) pitch, and a polymeric material. Each of these components is further described herein below.

Asphalt Binder

The modified asphalt binders disclosed herein include an asphalt binder. Many asphalt binders are suitable for use in the present disclosure. In some embodiments, the asphalt binder is obtained from crude petroleum, bituminous schists, heavy oils, bituminous sands, or coal. Asphalt binders suitable for modification as disclosed herein may possess, prior to modification, certain values for physical properties such as viscosity, G*/sin delta value, penetration, non-recoverable creep compliance, or softening point. The asphalt binder may have a viscosity of, for example, from about 1900 poise to about 3000 poise at 60° C. (140° F.), such as from about 2000 poise to about 2500 poise, or from about 2500 poise to about 2900 poise. The asphalt binder may also have a G*/sin delta value in excess of 1.0 kPa at temperatures ranging from 52° C. to 76° C., such as from 54° C. to 67° C. The asphalt binder may have a non-recoverable creep compliance 3.2 kPa ($J_{nr3.2}$) value of <4.5 kPa$^{-1}$ at 64° C. and/or at 67° C.; The asphalt binder may have a penetration from about 45 to about 77 dmm at 25° C., where dmm represents 0.1 mm of penetration as measured with a penetrometer under ASTM D5. The asphalt binder may have a softening point greater than about 50° C. In some embodiments, the asphalt binder, prior to modification, may have at least one, at least two, at least three, at least four, or may have all five of the foregoing properties. In some embodiments, the asphalt binder may have a performance grade (PG) designation of about PG 64-22 to about 67-22. A particularly suitable asphalt binder has a PG designation of PG 67-22.

SDA Pitch

The modified asphalt binders disclosed herein include a solvent deasphalted pitch. The SDA pitch may be characterized by a penetration value. For example, a suitable SDA pitch has a penetration of from 0 to 50 dmm @ 25° C. (77° F.), and preferably from 0 to 10 dmm @ 25° C. (77° F.), where dmm represents 0.1 mm of penetration as measured with a penetrometer under ASTM D5. SDA pitch may be characterized by a softening point. For example, a suitable SDA pitch may have a ring-and-ball softening point higher than about 200° F., such as from about 210° F. to about 240° F. In some embodiments, the SDA pitch has both a penetration from 0-10 dmm and a softening point from about 210° F. to about 240° F.

The quantity of SDA in the modified asphalt binder may vary. In some embodiments, the asphalt binder includes SDA pitch in an amount from about 1% to about 7% by weight, based on the weight of the asphalt binder plus the SDA. Surprisingly, it was found that inclusion of greater than about 7% by weight of SDA pitch, based on the total weight of the modified asphalt binder, provided asphalt binder that was excessively stiff and failed to meet low temperature compliance criteria, thus making it unsuitable for further modification with polymeric materials. In some embodiments, the asphalt binder includes SDA pitch in an amount from about 1% to about 6% by weight, based on the total weight of the modified asphalt binder. For example, in one or more embodiments, the asphalt binder includes SDA pitch in an amount from about 1%, about 2%, about 3%, to about 4%, about 5%, or about 6% by weight, based on the total weight of the modified asphalt binder. In some embodiments, the asphalt binder includes SDA pitch in an amount from about 4% to about 6%, or from about 5% to about 6% by weight, based on the total weight of the modified asphalt binder.

Polymeric Material

The modified asphalt binders disclosed herein may include a polymeric material. Suitable polymeric materials include, but are not limited to, polybutadienes, polyisoprenes, polyisobutenes, ethylene/vinyl acetate copolymers, polyacrylates, polymethacrylates, polychloroprenes, polynorbornenes, ethylene/propylene/diene (EPDM) terpolymers, and styrene-conjugated diene polymers. In some embodiments, the polymeric material is a styrene-conjugated diene polymer. For example, the polymeric material may be a styrene-butadiene copolymer. Generally, the "B" segment of suitable styrene-butadiene copolymers is a polymerized butadiene segment, which can be a polymerized conjugated diene having 4-6 carbons atoms, such as 1,3-butadiene, isoprene, 2-ethyl-1,3-butadiene, 2,3-dimethyl-1,3-butadiene or piperylene. Generally, the "S" segment is a monovinyl aromatic polysegment. Examples of such segments include, but are not limited to, polymerized styrene, □-methylstyrene, p-vinyltoluene, m-vinyltoluene, o-vinyltoluene, 4-ethylstyrene, 3-ethylstyrene, 2-ethylstyrene, 4-tert-butylstyrene and 2,4-dimethylstyrene. In some embodiments, the styrene-butadiene copolymer is a styrene and 1,3-butadiene copolymer. The weight percent (wt %) range of polystyrene units in the SB and SBS copolymers may range from about 10 to about 30% weight percent, such as from about 15 to about 25% weight percent. In some embodiments, the SB and SBS copolymers include a minimum of about 68% butadiene by weight, meaning the copolymers contain at least about 68% of polymerized butadiene, with the remainder being polymerized styrene. In some embodiments, the SB and SBS copolymers have a molecular weight in the range of from about 150,000 to about 200,000 daltons.

In some embodiments, the polymeric material is a styrene-butadiene random copolymer (also known as styrene-butadiene rubber or SBR), comprising repeat units derived from styrene and butadiene in which the styrene and butadiene units are randomly dispersed in the polymer molecule. In particular embodiments, the polymeric material is SB latex. SB latex is an aqueous emulsion of styrene-butadiene copolymer. SB latex differs from SBR due to its greater crosslink density. This attribute gives styrene-butadiene latex greater strength, as well as elasticity, compared to SBR.

In some embodiments, the polymeric material is a styrene-butadiene-styrene (SBS) block copolymer. SBS block copolymers are tri-block polymers having a polystyrene segment at the end portions of the polymer molecule and an elastomeric segment, the conjugated polybutadiene segment, being in the center of the block polymer molecules.

The SB copolymers and SBS block copolymers that are suitable for use in the asphalt binders of the present disclosure are well-known products that are commercially available. Both SBS block copolymers and SB random copolymers are commercially available from, for example, Dynasol Elastomers (Houston, Tex., USA), LCY Group, Kaohsiung City, Taiwan), TSRC (Taipei City, Taiwan) and Kumho Petrochemical (Seoul, Korea).

In one or more embodiments, the polymeric material may include ground tire rubber (GTR). GTR, also referred to as crumb rubber, is recycled tire rubber which has been ground into very small particles. In some embodiments, the polymeric material includes, but is not limited to, GTR in combination with SBS triblock copolymer.

In one or more embodiments, the modified asphalt binder also includes sulfur in order to facilitate the cross linking of at least a portion of the polymeric material. As known to one of skill in the art, a suitable amount (e.g., from about 0.1 to about 0.2% by weight) of sulfur may be added to the modified asphalt binder in order to promote cross linking of the polymeric material(s), thereby altering the physico-mechanical properties of the modified asphalt binder.

The quantity of polymeric material in the modified asphalt binder may vary depending on desired properties of the modified asphalt binder and the nature of the polymeric material. For example, in some embodiments, the modified asphalt binder includes SB latex in an amount from about 2% to about 4% by weight, such as from about 2% to about 3% by weight, based on the total weight of the modified asphalt binder. In some embodiments, the modified asphalt binder comprises SB latex in an amount of about 2.0%, about 2.1%, about 2.2%, about 2.3%, about 2.4%, about 2.5%, about 2.6%, about 2.7%, about 2.8%, about 2.9%, about 3% about 3.1%, about 3.2%, about 3.3%, about 3.4%, about 3.5%, or greater by weight, based on the total weight of the modified asphalt binder. Surprisingly, according to the present disclosure, it was found that inclusion of greater than about 4% by weight of SB-latex, based on the total weight of the modified asphalt binder, provided asphalt binder which had a gel consistency, and was unsuitable for the intended applications.

In one or more embodiments, modified asphalt binders of the present disclosure include asphalt binders modified with SDA pitch and SB latex, which provide enhanced performance properties. Specifically, according to the present disclosure, asphalt binder PG 67-22, when modified to include 2-3.5% SBR latex and 5-6% SDA pitch, results in a modified asphalt binder with $J_{nr3.2}$ values of between about 0.9 to about 1.4 kPa$^{-1}$, % R values of between about 24 to about 43, and z-factor values of between about 2.2 to about 9.1. Thus, these modified asphalt binders meet the MSCR specifications for the V grade designation. Further, these unexpected results are particularly surprising in view of the hardness and brittleness of SDA pitch, which would not be expected to increase or enhance elastic recovery properties.

In some embodiments, the modified asphalt binder includes SBS triblock copolymer in an amount from about 0.1% to about 1% by weight, such as from about 0.1%, about 0.2%, about 0.3%, about 0.4%, or about 0.5%, to about 0.6%, about 0.7%, about 0.8%, about 0.9%, or about 1.0%, based on the total weight of the modified asphalt binder. In some embodiments, the SBS triblock is present in an amount from about 0.4% to about 0.6% by weight, such as about 0.4%, about 0.5%, or about 0.6%, based on the total weight of the modified asphalt binder.

In some embodiments, the modified asphalt binder includes ground tire rubber in an amount from about 5% to about 20% by weight, or from about 7% to about 15%, or from about 9% to about 13%, or from about 10% to about 12%, based on the total weight of the modified asphalt binder.

In at least one embodiment, the modified asphalt binder includes ground tire rubber in an amount from about 5% to about 20% by weight, based on the total weight of the modified asphalt binder, and SBS triblock in an amount from about 0.1% to about 1% by weight, based on the total weight of the modified asphalt binder. In further specific embodiments, the modified asphalt binder includes ground tire rubber in an amount from about 7% to about 15% by weight, or from about 9% to about 13%, or from about 10% to about 12%, based on the total weight of the modified asphalt binder, and SBS triblock in an amount from about 0.4% to about 0.6% by weight, based on the total weight of the modified asphalt binder.

In one or more embodiments, modified asphalt binders of the present disclosure include asphalt binders modified with SDA pitch and SBS triblock polymer, which provide enhanced performance properties. Specifically, according to the present disclosure, PG 67-22 asphalt binder modified with 0.3-0.6% SBS, 4-5% SDA pitch, and 9-11% ground tire rubber results in a modified asphalt binder with $J_{nr3.2}$ values from between about 0.11 to about 0.18 kPa$^{-1}$, % R values from between about 46 to about 55, and z-factor values between about 0.3 to about 4.7. Thus, these modified asphalt binders meet the MSCR specifications for the E grade designation. Further, these unexpected results are particularly surprising in view of the hardness and brittleness of SDA pitch, which would not be expected to increase or enhance elastic recovery properties.

In one or more embodiments, an asphalt concrete pavement composition includes a modified asphalt binder as disclosed herein in an amount from about from 1% to about 20% by weight, based on the total weight of the pavement composition, and an aggregate material. The aggregate material may include one or more materials selected from the group consisting of stone, gravel, expanded aggregate, shells, ground silica, recycled asphalt, and Portland cement pavement. The modified asphalt binder and aggregate material may be combined (e.g., mixed) by any suitable method know in the art to provide the asphalt concrete pavement composition. Generally, the combining is performed at an elevated temperature to maintain fluidity of the modified asphalt binder, such as, but not limited to, a temperature of from about 150° C. to about 190° C.

In yet another aspect of the disclosure, a method for improving the performance grade properties of an asphalt binder includes:

i) combining a solvent deasphalted pitch, heated to a temperature of from about 150° C. to about 250° C.; and an asphalt binder, heated to a temperature of from about 150° C. to about 250° C., to form a first combination;

ii) mixing the first combination to form a first mixture;

iii) adding to the first mixture a polymeric material selected from styrene-butadiene (SB) copolymers, styrene-butadiene-styrene (SBS) copolymers, or combinations thereof, to form a second combination;

iv) mixing the second combination to form a SDA-polymer modified asphalt binder; and v) optionally, adding ground tire rubber to the SDA-polymer modified asphalt binder to form a third combination; and mixing the third combination to form a SDA-polymer-GTR modified asphalt binder.

In at least one embodiment, mixing the first combination includes mixing the first combination under low shear conditions for a period of time. In at least one embodiment, the period of time is from about 15 minutes to about 30 minutes, or from about 30 minutes to about 1 hour.

In at least one embodiment, mixing the second combination includes mixing the second combination under low shear conditions for a period of time. In one embodiment, the period of time is from about 15 minutes to about 30 minutes, or from about 30 minutes to about 1 hour. In at least one embodiment, mixing the second combination includes mixing the second combination under high shear conditions for a period of time. In at least one embodiment, the period of time is from about 30 minutes to about 6 hours, or from about 1 hour to about 3 hours.

In at least one embodiment, mixing the third combination includes mixing the third combination under high shear conditions for a period of time. In one embodiment, the period of time is from about 15 minutes to about 30 minutes, or from about 30 minutes to about 1 hour.

In one or more embodiments, the method further includes adding sulfur as a cross-linking agent in an amount by weight of from about 0.1% to about 0.2%, based on the weight of the second combination or the third combination.

In some embodiments, the modified asphalt binder exhibits one or more of a $J_{nr3.2}$ value from between about 0.11 to about 1.4 kPa$^{-1}$, a % R value from between about 24 to about 55, and a z-factor value from between about 0.3 to about 9.1.

In some embodiments, the SDA pitch and asphalt binder are mixed and maintained at an elevated temperature, such as from about 150° C. to about 250° C., for a period of time. This period of time may vary. For example, in some embodiments, the mixture of SDA and asphalt binder is maintained at the elevated temperature until it is ready to use in the final application (e.g., paving), at which point the polymeric material(s) may be added with high shear mixing.

Many modifications and additional embodiments in accordance with the present disclosure will come to mind to those skilled in the art having the benefit of the teachings presented in the foregoing description. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

EXAMPLES

Aspects of the disclosed embodiments are more fully illustrated by the following examples, which are set forth to illustrate certain aspects thereof but are not to be construed as limiting thereof. It is to be understood by those skilled in the art that the aspects of the following exemplary embodiments are not limited to the details of construction or process steps set forth in their description, and are capable of combination and/or use in other embodiments and of being practiced or being carried out in various ways.

Example 1. Asphalt Binder Modified with 1-10% SDA Pitch (Reference)

Reference samples of asphalt binder (PG 67-22 designation) modified with solvent deasphalted pitch (SDA) were prepared using various concentrations of SDA (1, 3, 5 and 10% SDA by weight, based on the total weight of the modified asphalt binder; Examples 1A-D, respectively).

The asphalt binder was heated to a temperature of about 150° C.±5° C. The SDA was heated to a temperature of about 175° C.±5° C. The two heated materials were combined in a metal container at the indicated concentrations (1, 3, 5 and 10% SDA by weight). The sample mixtures were each heated on a heating mantle to an internal temperature of 160° C.±5° C., and each sample mixture was blended under low shear mixing (stirring) while maintaining the 160° C.±5° C. temperature for about 30 minutes to ensure complete blending. The mixtures were allowed to cool to provide the SDA modified asphalt binders (Examples 1A-D).

The samples were evaluated in the MCSR test at 67° C. Results are provided in Table 1, which demonstrate that increasing amounts of SDA pitch improve the asphalt binder resistance to permanent deformation (e.g., rutting resistance) as quantified by the non-recoverable creep compliance at 3.2 kPa (% R). However, the elastic recovery properties, as measured by the z-factor, fail (i.e., negative z-factor) for the reference samples with only SDA pitch added to the asphalt binder. Example 1D, which included 10% by weight of SDA pitch, was too stiff to meet low temperature compliance criteria as determined by the m-value. The m-value is the slope of the curve from a plot of the log of creep stiffness versus the log of the time in a mid-span beam rheometer deflection study according to AASHTO T313. Specifically, the m-value was 0.295 at −12° C., while the AASHTO M320 criterion requires an m-value of greater than or equal to 0.3. Accordingly, asphalt binder modified with 10% SDA pitch was not deemed appropriate for polymeric modification, and was not studied further. Based on a plot of m-value versus % SDA, it was determined that the amount of SDA pitch should be 7% or less to meet the m-value criterion of equal to or greater than 0.3.

TABLE 1

SDA pitch modified asphalt MCSR results

| Parameter | Ex. 1A | Ex. 1B | Ex. 1C | Ex. 1D |
|---|---|---|---|---|
| Percent Asphalt Binder | 99 | 97 | 97 | 90 |
| Grams Asphalt Binder | 500 | 500 | 500 | 500 |
| Grams SDA | 5 | 15 | 27 | 55.5 |
| Percent SDA | 1 | 3 | 5 | 10 |
| Jnr @ 3.2 kPa 67° C., kPa$^{-1}$ | 3.45 | 2.78 | 2.51 | 1.82 |

TABLE 1-continued

SDA pitch modified asphalt MCSR results

| Parameter | Ex. 1A | Ex. 1B | Ex. 1C | Ex. 1D |
|---|---|---|---|---|
| % R 3.2 KPa 67° C. | 0.0 | 0.3 | 0.10 | 1.10 |
| z-factor | −21.2 | −22.1 | −22.9 | −24.0 |

Example 2. Asphalt with 3% SB-Latex

A reference sample of asphalt binder (PG 67-22 designation) modified with 3% styrene-butadiene latex (SB-latex) was prepared. The asphalt binder was heated to a temperature of about 160° C.±5° C. SB-latex in an amount of 3% by weight, based on the total weight of the modified asphalt binder, was added. The sample was blended together under low shear mixing for about 30 minutes to ensure complete blending. The mixture was allowed to cool to provide the SB-latex modified asphalt binder (Example 2).

The sample was evaluated in the MCSR test at 67° C. The result is provided in Table 2, which demonstrates that the elastic recovery properties, as measured by the z-factor, again fail (i.e., negative z-factor) for this reference sample.

TABLE 2

3% SB-latex modified asphalt MCSR results

| Parameter | Ex. 2 |
|---|---|
| Percent Asphalt Binder | 97 |
| Percent SB-latex | 3 |
| Jnr @ 3.2 kPa 67° C., kPa$^{-1}$ | 1.4 |
| % R 3.2 KPa 67° C. | 0 |
| z-factor | −3.3 |

Example 3. Asphalt with 5-6% SDA Pitch and 2.3-3% SB-Latex

Samples (Examples 3A-3D) of PG 67-22 asphalt modified with SDA (5 or 6%) and SB-latex (2.3, 2.5, and 3%) were prepared.

Asphalt binder modified with SDA pitch in an amount by weight of 5% or 6%, based on the total weight of the modified binder, was prepared according to the procedure of Example 1.

Samples of asphalt binder modified with both SDA pitch and SB-latex were prepared from the SDA pitch-modified asphalt binders. The SDA pitch-modified asphalt binders were heated to a temperature of about 160° C.±5° C. SB-latex in the required amount (2.3, 2.5, and 3% by weight, based on the total weight of the modified asphalt binder), was added. The samples were each blended under low shear mixing for about 30 minutes to ensure complete blending of the components. The mixtures were allowed to cool to provide the SDA and SB-latex modified asphalt binders (Examples 3A-3D). The composition of each is provided in Table 3.

The samples of Examples 3A-3D, along with a sample of reference Example 2, were evaluated in the MCSR test at 67° C. Results of the test are provided in Table 3, which demonstrates that SDA Pitch in combination with 2.2-3% SB-latex improves the asphalt performance. Specifically, asphalt modified with 5-6% SDA Pitch and 2.3-3% SBR-latex meets the rutting resistance and elastic recovery test criteria.

TABLE 3

5-6% SDA Pitch and 2.3-3% SB-latex modified asphalt MCSR Results

| Parameter | Ex. 3A | Ex. 3B | Ref., Ex. 2 | Ex. 3C | Ex. 3D |
|---|---|---|---|---|---|
| Asphalt PG 67-22 (wt %) | 92.7 | 92.5 | 97 | 92 | 92 |
| SDA (wt %) | 5 | 5 | 0 | 5 | 6 |
| SB-latex (wt %) | 2.3 | 2.5 | 3 | 3 | 3 |
| High Temperature Compliance HTC, ° C. | 75.8 | 76.1 | 74.3 | 74.9 | 75.9 |
| Jnr @ 3.2 kPa 67° C., 1/kPa | 0.9 | 1.0 | 1.4 | 0.6 | 0.6 |
| % R 3.2 KPa 67° C. | 32.2 | 32.4 | 23.6 | 41.6 | 43.1 |
| z-factor | 2.2 | 2.9 | −3.3 | 8.0 | 9.1 |

Example 4. Asphalt with 4.2-5% SDA Pitch, 0.4-0.6 SBS and 11% GTR

Samples of PG 67-22 asphalt binder modified with SDA pitch (4.2-5% by weight), styrene-butadiene-styrene block copolymer (SBS) at 0.4-0.6% by weight, and ground tire rubber (GTR) at 11% by weight, were prepared (Examples 4A-4D).

Samples of asphalt binder modified with SDA pitch in an amount by weight of 4.2, 4.3, 4.4, or 5%, based on the total weight of the modified binder, were prepared according to the procedure of Example 1.

The samples were each heated to 180° C.±5° C. The required amount of SBS (0.4, 0.5, or 0.6% by weight) was added into the respective SDA modified asphalt binder. Using a high shear mixer, the mixtures were each blended for 2 hours. To each sample was added 11% by weight of GTR, and mixing was continued for an additional 30 minutes. The samples were allowed to cool to provide the asphalt binders modified with SDA, SBS, and GTR (Examples 3A-3D). The composition of each is provided in Table 4.

These samples were evaluated in the MCSR test at 67° C. Results are provided in Table 4, which demonstrates that SDA pitch in combination with SBS and GTR improves the asphalt performance. Specifically, asphalt modified with 11% GTR, 4.2-5% SDA pitch, and 0.5-0.6% SBS (Example 4C and 4D) demonstrates improved rutting resistance and meets the MSCR elastic recovery test criteria (% R>50).

TABLE 4

SDA Pitch, SBS and GTR modified asphalt MCSR Results

| Parameter | Ex. 4A | Ex. 4B | Ex. 4C | Ex. 4D |
|---|---|---|---|---|
| Asphalt PG 67-22 (wt %) | 84.2 | 83.6 | 84.2 | 84.2 |
| SDA (wt %) | 4.4 | 5 | 4.3 | 4.2 |
| SBS (wt %) | 0.4 | 0.4 | 0.5 | 0.6 |
| GTR (wt %) | 11 | 11 | 11 | 11 |
| HTC, C. | 91.0 | 91.5 | 95.1 | 93.5 |
| Jnr @ 3.2 kPa 67° C., 1/kPa | 0.17 | 0.18 | 0.11 | 0.13 |
| % R 3.2 KPa 67° C. | 48.35 | 46.50 | 55.40 | 54.75 |
| z-factor | 1.3 | 0.3 | 3.4 | 4.7 |

Example 5. Asphalt with 3.5% SB-Latex

A reference sample of asphalt binder (PG 67-22 designation) modified with 3.5% styrene-butadiene latex (SB-latex) was prepared. The asphalt binder was heated to a temperature of about 160° C.±5° C. SB-latex in an amount of 3.5% by weight, based on the total weight of the modified asphalt binder, was added. The sample was blended together under low shear mixing for about 30 minutes to ensure complete blending. The mixture was allowed to cool to provide the SB-latex modified asphalt binder (Example 5). This material exhibited a gel consistency which made it unsuitable for further evaluation.

Example 6. Asphalt Concrete Pavement Composition

A sample of asphalt concrete composition is prepared from a modified asphalt binder as disclosed herein in an amount by weight from about 1 to about 20%, and an aggregate material in an amount by weight from about 99 to about 80%, based on the total weight of the asphalt concrete composition. For example, one or more aggregate materials selected from the group consisting of stone, gravel, expanded aggregate, shells, ground silica, recycled asphalt, and Portland cement pavement is combined with the modified asphalt binder according to methods known to one of skill in the art to provide the asphalt concrete pavement composition. Generally, the materials are combined at an elevated temperature sufficient to maintain fluidity of the modified asphalt binder, such as a temperature of from about 150° C. to about 190° C. Such compositions are suitable as surfaces for, for example, roads, parking lots, and the like.

What is claimed is:

1. A modified asphalt binder comprising an asphalt binder, a solvent deasphalted pitch, and a polymeric material, the modified asphalt binder having two or more of:
    a viscosity of from about 1900 poise to about 3000 poise at 60° C. (140° F.),
    a G*/sin delta value in excess of 1.0 kPa at temperatures ranging from 64° C. to 67° C.,
    a non-recoverable creep compliance 3.2 kPa ($J_{nr3.2}$) value of <4.5 $kPa^{-1}$ at 64° C. and/or at 67° C.,
    a penetration of from about 45 to about 77 dmm at 25° C., where dmm represents 0.1 mm of penetration as measured with a penetrometer under ASTM D5, or
    a softening point greater than about 50° C.

2. A modified asphalt binder comprising an asphalt binder, a solvent deasphalted pitch, and a polymeric material, the asphalt binder, prior to modification, having a performance grade (PG) designation of from PG 64-22 to PG 67-22.

3. A modified asphalt binder comprising an asphalt binder, a solvent deasphalted (SDA) pitch, and a polymeric material, the SDA pitch having a penetration of from 0-10 dmm, a softening point of from about 210° F. to about 240° F., or both.

4. A modified asphalt binder comprising an asphalt binder, a solvent deasphalted (SDA) pitch, and a polymeric material, the SDA pitch being present in an amount from about 1% to about 7% by weight, based on total weight of the asphalt binder and SDA.

5. The modified asphalt binder of claim 4, wherein the SDA pitch is present in an amount from about 5% to about 6% by weight, based on total weight of the modified asphalt binder.

6. A modified asphalt binder comprising an asphalt binder, a solvent deasphalted (SDA) pitch, and a polymeric material with styrene-butadiene (SB) or styrene-butadiene-styrene (SBS) copolymers having a polymerized butadiene content by weight of at least about 68%.

7. A modified asphalt binder comprising an asphalt binder, a solvent deasphalted pitch, and styrene-butadiene latex.

8. The modified asphalt binder of claim 7, wherein the SB latex is present in an amount from about 2% to about 4% by weight, based on total weight of the modified asphalt binder.

9. The modified asphalt binder of claim 7, wherein the SB latex is present in an amount from about 2.2% to about 3% by weight, based on total weight of the modified asphalt binder.

10. The modified asphalt binder of claim 7, wherein the SDA pitch is present in an amount from about 5% to about 6% by weight, based on total weight of the modified asphalt binder, and
the SB latex is present in an amount from about 2.2% to about 3% by weight, based on total weight of the modified asphalt binder.

11. A modified asphalt binder comprising an asphalt binder, a solvent deasphalted (SDA) pitch, ground tire rubber in an amount from about 5% to about 20% by weight, based on total weight of the modified asphalt binder, and
styrene-butadiene-styrene (SBS) triblock copolymer in an amount from about 0.1% to about 1% by weight, based on the total weight of the modified asphalt binder.

12. The modified asphalt binder of claim 11, wherein the ground tire rubber is present in an amount from about 7% to about 15% by weight, based on the total weight of the modified asphalt binder.

13. The modified asphalt binder of claim 11, wherein the SBS triblock copolymer is present in an amount from about 0.4% to about 0.6% by weight, based on the total weight of the modified asphalt binder.

14. A modified asphalt binder comprising an asphalt binder, a solvent deasphalted pitch, ground tire rubber in an amount from about 9% to about 13% by weight, based on total weight of the modified asphalt binder, and
a SBS triblock copolymer in an amount from about 0.4% to about 0.6% by weight, based on the total weight of the modified asphalt binder.

15. An asphalt concrete pavement composition comprising:
a modified asphalt binder containing an asphalt binder, a solvent deasphalted pitch, and a polymeric material, the modified asphalt binder being present in an amount from about from 1% to about 20% by weight, based on total weight of the asphalt concrete pavement composition; and
an aggregate material.

16. The asphalt concrete pavement composition of claim 15, wherein the aggregate material includes one or more materials selected from the group consisting of stone, gravel, expanded aggregate, shells, ground silica, recycled asphalt, and Portland cement pavement.

17. A method for producing an asphalt binder, the method comprising:
i) combining a solvent deasphalted pitch, heated to a temperature of from about 150° C. to about 250° C.; and an asphalt binder, heated to a temperature of from about 150° C. to about 250° C., to form a first combination;
ii) mixing the first combination to form a first mixture;
iii) combining with the first mixture a polymeric material selected from styrene-butadiene (SB) copolymers, styrene-butadiene-styrene (SBS) copolymers, or combinations thereof, to form a second combination; and
iv) mixing the second combination to form a SDA-polymer modified asphalt binder.

18. The method of claim 17, further comprising adding ground tire rubber to the SDA-polymer modified asphalt binder to form a third combination, and mixing the third combination to form a SDA-polymer-GTR modified asphalt binder.

19. The method of claim 17, wherein the first combination is performed at a first physical location, and wherein the combining of the polymeric material with the first mixture is performed at a second different physical location.

20. The method of claim 17, further comprising transporting the first mixture to a different physical location prior to the step of combining the first mixture with the polymeric material.

* * * * *